United States Patent [19]

Takanaga et al.

[11] Patent Number: 5,747,887

[45] Date of Patent: May 5, 1998

[54] MULTI-FUNCTION ELECTRIC POWER CONVERSION SYSTEM

[75] Inventors: Toshiyuki Takanaga; Yasuo Taguchi, both of Tokyo; Seiji Sadayoshi, Kanagawa; Mikio Kato, Kanagawa; Kazuo Kuroki, Kanagawa, all of Japan

[73] Assignees: Kundenko Co., Ltd., Tokyo; Fuji Electric Co., Ltd., Kanagawa, both of Japan

[21] Appl. No.: 32,244

[22] Filed: Mar. 17, 1993

[51] Int. Cl.$^6$ .................................................. H02J 7/00
[52] U.S. Cl. ........................... 307/64; 307/44; 307/85
[58] Field of Search ................................ 307/64, 66, 45, 307/46, 48, 44, 85–87

[56] References Cited

U.S. PATENT DOCUMENTS

| | | | |
|---|---|---|---|
| 3,946,242 | 3/1976 | Wilkerson | 307/45 |
| 4,703,193 | 10/1987 | Kawabata | 307/66 |
| 4,731,547 | 3/1988 | Alenduff et al. | 307/44 |
| 5,221,862 | 6/1993 | Fiorina et al. | 307/66 |
| 5,237,208 | 8/1993 | Tominaga et al. | 307/66 |
| 5,315,533 | 5/1994 | Stich et al. | 307/66 |

FOREIGN PATENT DOCUMENTS 4-33529 (A)  2/1992  Japan ................. H02J 7/35

*Primary Examiner*—William M. Shoop, Jr.
*Assistant Examiner*—Jonathan S. Kaplan
*Attorney, Agent, or Firm*—Finnegan, Henderson, Farabow, Garrett & Dunner, L.L.P.

[57] ABSTRACT

The bus line of an electric power system is connected to an inverter which can be placed in a forward operation mode or in a reverse operation mode, and batteries are connected to the inverter to store the dc energy thereof. When a commercial power source is normal, an ac switch is closed, so that the inverter is placed in the forward operation mode to perform an active filter operation for eliminating harmonic current and reactive current. When necessary, the batteries are charged, and the inverter is placed in the reverse operation mode to perform a peak cut power generation. At loss of the commercial power source or momentary drop of the supply voltage, the switch is opened so that the inverter is placed in the reverse operation mode to perform an UPS operation (emergency power generation). Hence, electric power is supplied without interruption to an important load and the emergency load.

5 Claims, 3 Drawing Sheets

MULTI-FUNCTION ELECTRIC POWER CONVERSION SYSTEM

BACKGROUND OF THE INVENTION

1. Field of the Invention

This invention relates to multi-function electric power conversion systems, and more particularly to a multi-function electric power conversion system in which a power conversion unit interconnected to an electric power system is combined with batteries, and operation modes are suitably selected for the power conversion unit according to the conditions of a commercial power source or the power receiving conditions of a load, so that the power conversion unit performs an active filter operation, UPS (uninterruptible power system) operation, emergency power generation operation, peak cut power generation operation, and battery charging operation.

2. Description of the Conventional Art

Recently, electronic applied equipment has been increased in kind and in number, and the rate of rectification equipment to load equipment has been being increased accordingly. However, as is well known in the art, the rectification equipment forms harmonic currents in the electric power system, and is a source of forming reactive currents. The harmonic currents may burn electric power equipment such as capacitors in the electric power system, and distort the system voltage, thus resulting in erroneous operations of various sensitive electronic equipments or interruption in communication systems. The reactive currents lower the power-factor, thus causing increased power transmission loss or system voltage fluctuations.

In order to eliminate those difficulties, a passive filter such as an ac LC filter or an active filter using an electric power converter is connected to the system.

In an electronic equipment such as a computer, momentary interruption of the supply of power or momentary drop of the supply voltage much adversely affects its operation and, for instance, may stop the system operation, as a result of which large-scale confusion may take place in the field of data communication or service.

Hence, it is of urgent necessity to improve the quality of electric power by removing the harmonic currents and reactive currents and by stabilizing and stably supplying the voltage.

On the other hand, technological societies recently have been information-oriented and highly advanced, and industrial operations have been effected on large-scale, and therefore the degree of dependence on electrical energy has been increased year by year. Hence, electric companies have pushed on with nuclear power generation to increase the supply of electric power. Furthermore, society itself pays great attention to the use of clean power units such as storage batteries, solar cells and fuel cells which use no fossil fuel.

The electric power demand is variable depending on seasons and time zones. It is well known in the art that the electric power demand reaches the peak during daytime in summer. This imbalance in electric power demand affects the equipment utilization factor of electric power companies, thus causing a great economical loss. Hence, there has been a strong demand for provision of means for leveling the electric power demand. In order to meet this requirement, electric power companies have proposed a power rate schedule to level the power demand, and a system in which, when a consumer cooperates positively for peak cut of the power demand, then a power rate to that consumer is discounted according to a supply and demand adjustment contract.

On the other hand, power sources relatively low in capacity using new energy sources such as solar cells and fuel cells have been put in practical use. Such power sources may be installed, as distributed power sources, at the consumer locations. This system is being extensively employed.

As was described above, it is essential to improve the quality of the electric power and to supply it stably. Hence, an active filter, and a parallel feed system of commercial power source and UPS have been proposed in the art. However, none of them can satisfy all the requirements by itself. It should be noted that there has been proposed no system in which peak power demand is cut.

At the same time, there has been a strong demand for provision of a power source system which uses no fossil fuel, thus contributing to energy saving and environmental protection, and which, being simple in arrangement, can be installed at each consumer location.

SUMMARY OF THE INVENTION

Accordingly, an object of this invention is to solve the above-described problems. More particularly, an object of the invention is to provide a multi-function electric power conversion system which is able to perform an active filter operation, UPS operation, emergency power generation operation, peak cutting power generation operation, and battery charging operation by itself, thus contributing to improvement of the quality of electric power and to the stable supply of electric power and to the leveling of the power demand, and which is not against environmental protection, and suitable as a distributed power source.

The foregoing object has been achieved by the provision of a multi-function electric power conversion system which comprises: a power conversion unit such as an inverter which is connected to an electric power system and can be placed selectively in a forward operation mode or in a reverse operation mode; a DC energy storing unit such as a battery connected to the DC side of the power conversion unit; and commercial power source's abnormal condition detecting means, such as a high-response undervoltage relay, for detecting abnormal conditions of the commercial power source such as the occurrence of a loss of the commercial power source or the voltage drop thereof, and in which when the commercial power source is acceptable, the power conversion unit is placed in the forward operation mode to operate as an active filter, and, when necessary, the DC energy storing unit is charged, and the power conversion unit is placed in the reverse operation mode to perform a power generation for cutting the peak in the power demand for the commercial power source, and when the commercial power source's abnormal condition detecting means detects an abnormal condition of the commercial power, an AC switch through which the system is interconnected to the commercial power source is turned off, so that the power conversion unit is placed in the reverse operation mode to operate as an uninterruptible power supply, whereby electric power is supplied to the important load without interruption.

With the multi-function power conversion system of the invention, the power conversion unit is placed selectively in the forward operation mode or in the reverse operation mode according to the conditions of the commercial power source or the conditions of the load, whereby the active filter operation, peak cut power generation operation, DC-energy-storing-unit charging operation, UPS operation, and emergency power generation operation are carried out.

Thus, according to the invention, a power source system can be realized which achieves improvement of the quality of electric power, stable supply of the electric power, the leveling of electric power demand, and environmental protection by itself, and which is suitable as a distributed power source.

DETAILED DESCRIPTION OF THE PREFERRED EMBODIMENTS

Preferred embodiments of this invention will be described with reference to the accompanying drawings.

Figure 1:
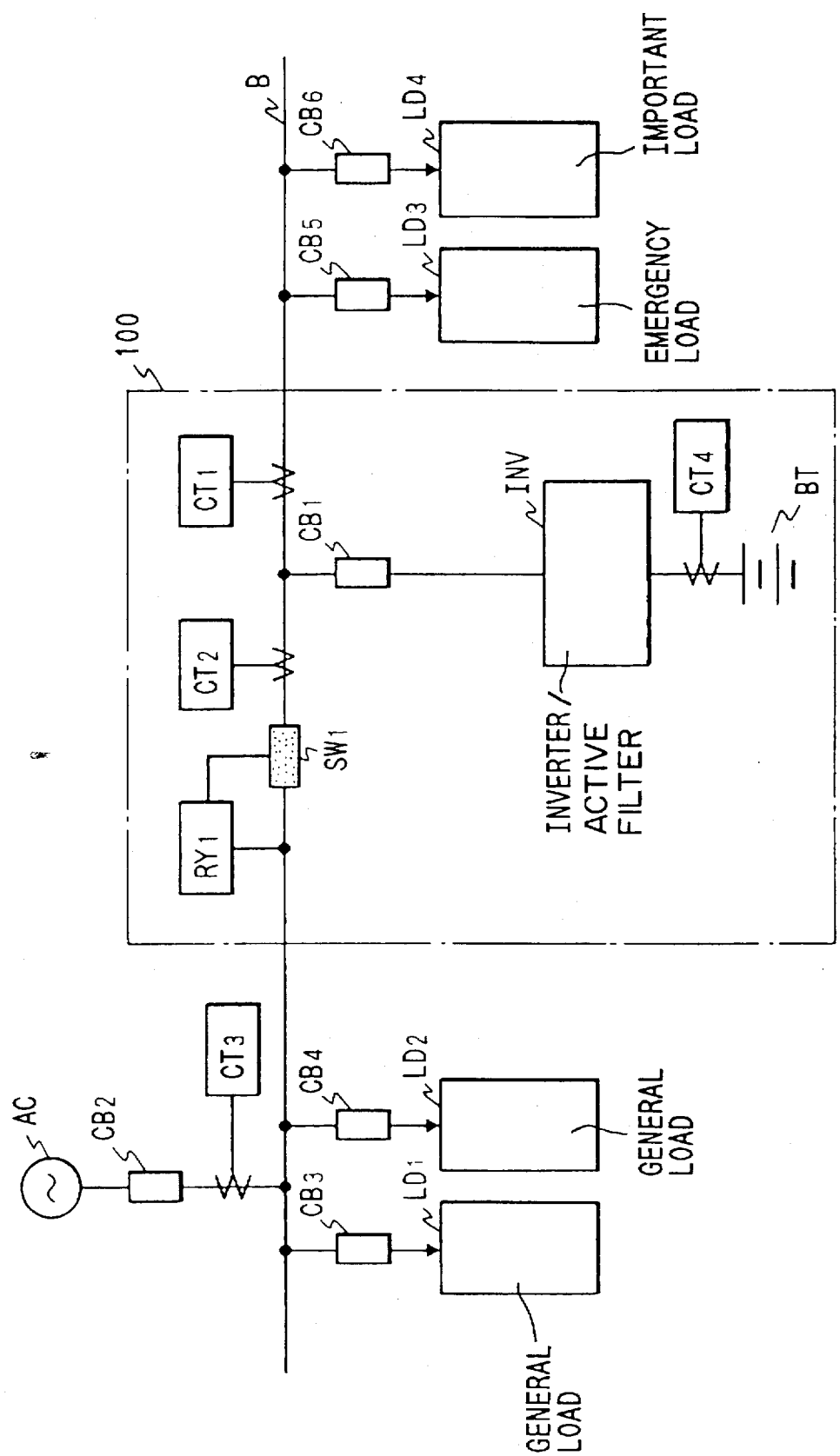
FIG. 1 is a circuit diagram, partly as a block diagram, showing the arrangement of a first embodiment of this invention.

FIG. 1 is a circuit diagram, partly as a block diagram, showing the arrangement of an electric power system including a multi-function electric power conversion system 100, which constitutes a first embodiment of the invention. The first embodiment is applied to a power system relatively small in capacity in which the bus line is of a low voltage system.

In FIG. 1, AC designates a commercial power source. A bus B is connected to the commercial power source AC through a circuit breaker $CB_2$ and a current transformer $CT_3$. The general loads $LD_1$ and $LD_2$ are connected to the bus line B on the side of the commercial power source AC through circuit breakers $CB_3$ and $CB_4$ respectively.

In the multi-function electric power conversion system 100, a high-response undervoltage relay $RY_1$, an AC switch $SW_1$ comprising a semiconductor switch, and current transformers $CT_2$ and $CT_1$ are connected to the bus B in the stated order beginning from the side of the commercial power source AC. The AC side of an inverter INV, which is a power converter which is reversible in operation, is connected through a circuit breaker $CB_1$ to the bus B between the current transformers $CT_2$ and $CT_1$. The inverter INV is, for instance, a self-excited voltage type inverter. DC energy storing means, namely, batteries BT are connected through a current transformer $CT_4$ to the DC side of the inverter INV.

The part of the bus B, which is further from the commercial power source AC than the power conversion system 100, is connected through a circuit breaker $CB_5$ to emergency loads $LD_3$ and through a circuit breaker $CB_6$ to important loads $LD_4$. The emergency loads $LD_3$ are emergency apparatus including a standby generation set which is provided according to the legal obligation for the fire defense and the building standard (under the Fire Service Law and the Building Standard Law), and generally a power loss for about ten (10) seconds is allowable. As for the important load $LD_4$, even momentary drop of the supply voltage or momentary interruption of the supply of power is not permitted as in the case of the load being such as a computer.

The operation of the first embodiment thus organized will be described.

When the commercial power source AC is normal, the AC switch $SW_1$ is closed, so that AC power is supplied from the commercial power source AC to the emergency load $LD_3$ and the important load $LD_4$.

In this case, the inverter INV of the power conversion system 100 detects a harmonic current which flows in the current transformer $CT_1$ attributing to a rectification load or the like, and causes a current to flow which is opposite in phase to the harmonic current, thereby to minimize the harmonic current flowing in the current transformer $CT_2$. Furthermore, the inverter controls the reactive current flowing in the current transformer $CT_1$ so that the current flowing in the current transformer $CT_2$ be of a power factor 1 having no reactive component.

That is, in this case, the inverter INV is placed in a forward conversion operation mode to perform an active filter operation and a reactive power suppression operation.

When the load is increased, and it is detected from the current or power detected by the current transformer $CT_3$ on the side of the commercial power source AC that the demand power has exceeded a predetermined value, the inverter INV performs a reverse conversion operation by receiving the DC power of the battery BT, to supply electric power corresponding to an amount of load increased in the system. In this case, the power conversion system 100 performs a peak cut power generation operation, thus leveling the demand power for the commercial power source AC.

When the power of the batteries BT decreases, or the demand power becomes lower than the predetermined value, the operation of the inverter is returned to above-described active filter operation.

When the peak cut power generation operation is carried out as described above, the batteries BT are discharged. Therefore, it is necessary to charge the batteries BT. This battery charging operation is carried out during the active filter operation after the peak cut power generation operation. That is, the battery charging operation is achieved by controlling the DC voltage of the inverter INV while current limitation is being effected so that the detection current of the current transformer $CT_4$ on the DC side of the inverter INV may not exceed a predetermined value. Preferably the charging operation is carried out by using night power which is relatively low in cost, with the aid of a timer or the like.

When the commercial power source AC is interrupted or the voltage is momentarily dropped, the undervoltage relay $RY_1$ is immediately operated to turn off the AC switch $SW_1$ thereby to disconnect the multi-function electric power conversion system from the commercial power source AC. And the operation mode of the inverter INV is switched from the forward conversion operation mode serving as an active filter over to the reverse conversion operation mode, so that AC power is supplied to the emergency load $LD_3$ and the important load $LD_4$ without being interrupted at all. That is, in this case, the inverter INV operates as an UPS or an emergency power source.

To open the AC switch $SW_1$ immediately is to prevent the electric power system from being over-loaded with the AC power outputted by the inverter INV.

Figure 3:
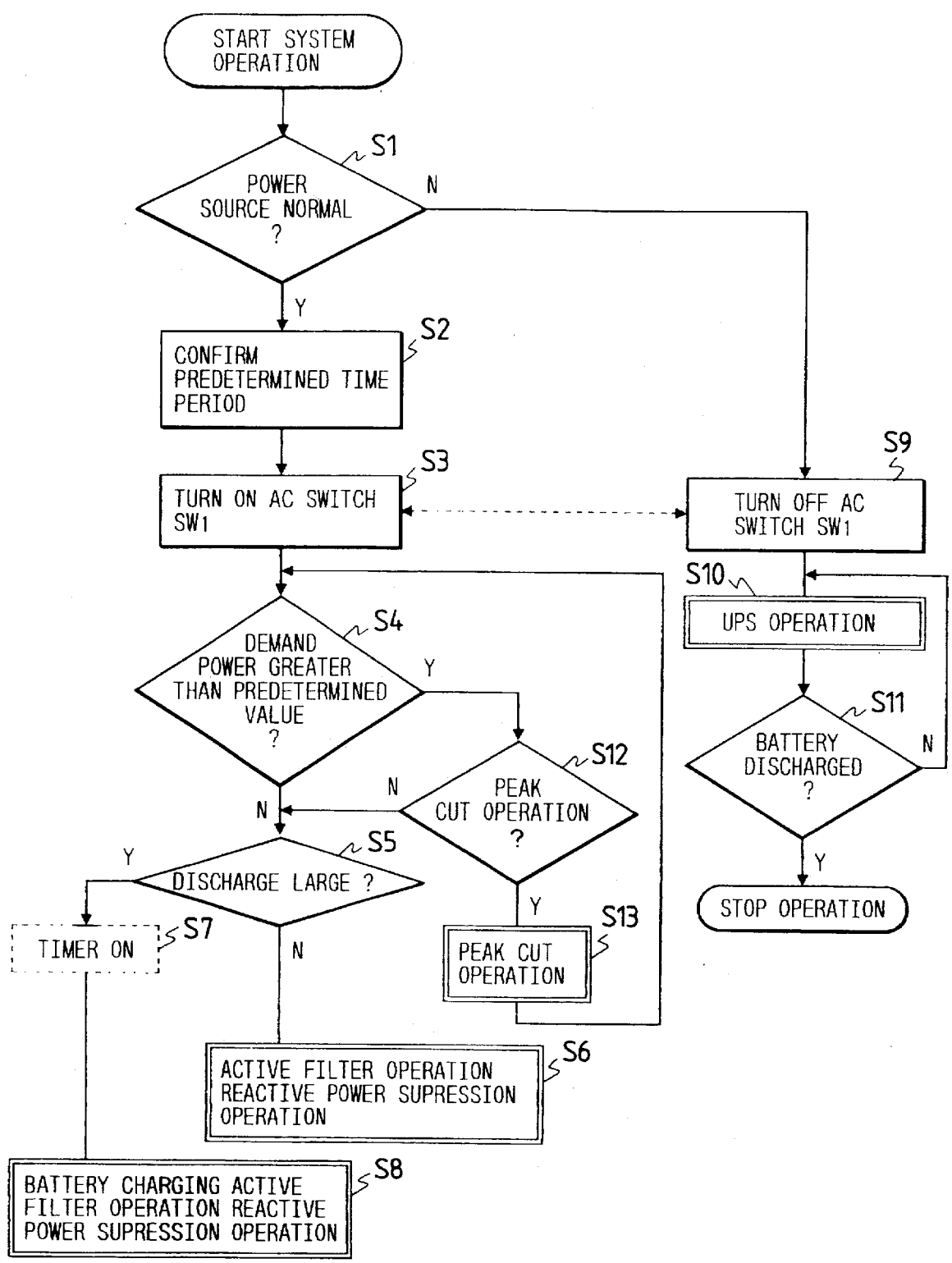
FIG. 3 is a flow chart for a description of the operations of the first and second embodiments of the invention.

FIG. 3 is a flow chart for a description of the sequence of the above-described operations. First, the system is started by turning on the main switch. When the commercial power source AC is normal (Step S1, YES), a predetermined time period is confirmed with the timer (Step S2) and the AC switch $SW_1$ is turned on (Step S3). As a result, the loads $LD_3$ and $LD_4$ are supplied AC power from the commercial power source AC.

In the system, under this condition the demand power is monitored at all times. When the demand power is lower than the predetermined value (Step S4, NO), then the present charge (or discharge) condition of the batteries BT is detected. When the amount of discharge is small (Step S5, NO), the active filter operation and the reactive power suppression operation are carried out (Step S6). When the amount of discharge is large (Step S5, YES), the active filter operation and the reactive power suppression operation are performed, and the batteries BT are charged (Step S8). In the case where midnight power is used for charging the batteries, the timer is turned on (Step S7) so that the charging operation is started in response to an instruction from the timer.

If, in Step S1, abnormal conditions occur with the commercial power source; for instance, a failure occurs with the commercial power source AC or the supply voltage drops momentarily (Step S1, NO), the AC switch $SW_1$ is turned off immediately (Step S9), and an UPS operation (emergency power generation) is carried out (Step S10). In this operation, the batteries BT are discharged; the UPS operation is continued until the batteries completely discharged (Step S11, NO), and it is ended when the batteries are completely discharged (Step S11, YES).

If, in Step S4, the demand power is increased to exceed the set value (Step S4, YES), then Step S12 is effected. In Step S12, it is determined whether or not the peak cut operation should be carried out. When it is determined that the peak cut operation should be carried out (Step S12, YES), then Step S13 is effected; that is, the peak cut operation is carried out. If, in Step S4, the demand power is smaller than the set value, then Step S5 is effected.

Figure 2:
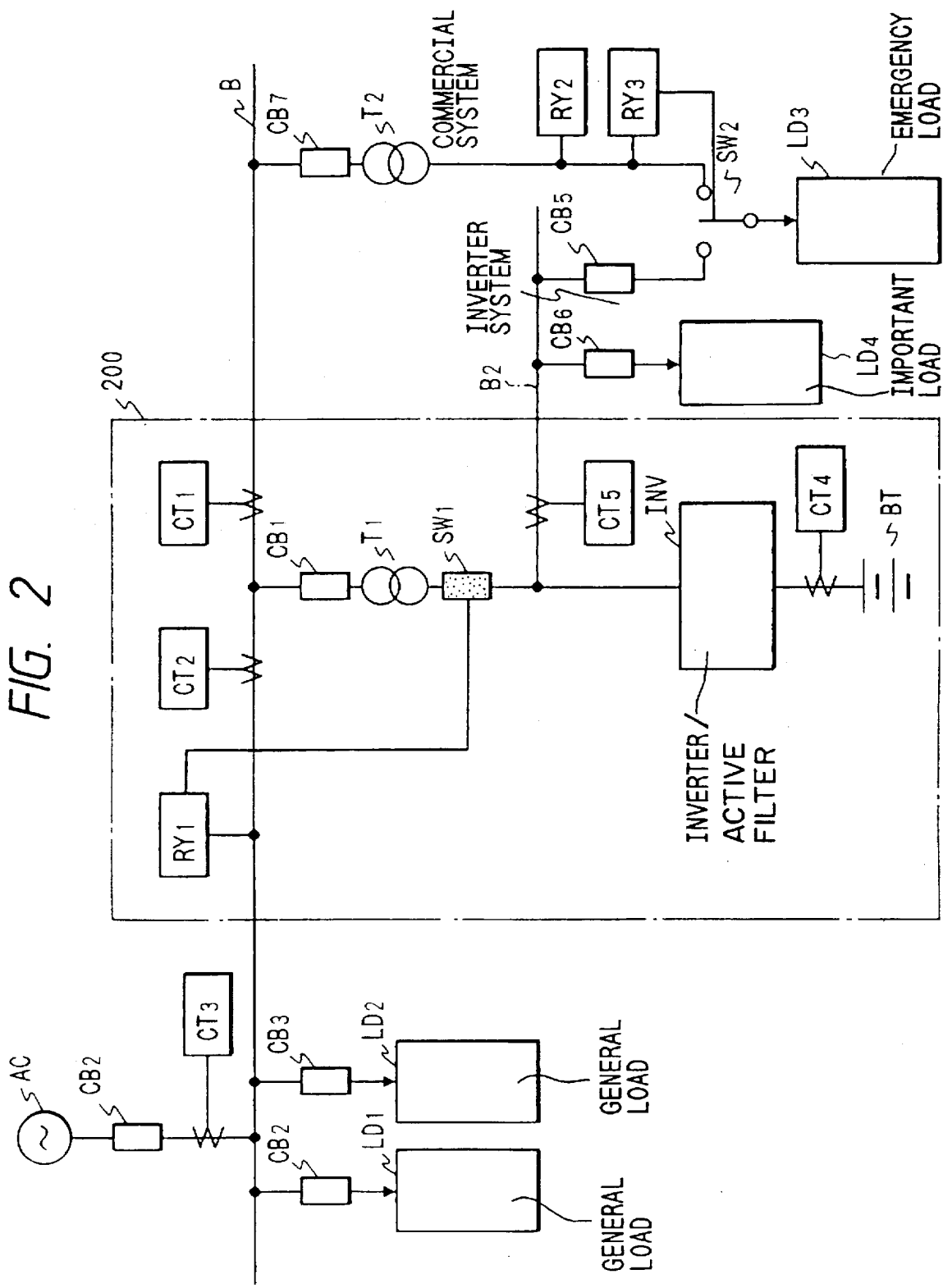
FIG. 2 is also a circuit diagram, partly as a block diagram, showing the arrangement of a second embodiment of the invention.

FIG. 2 is a circuit diagram, partly as a block diagram, showing the arrangement of another multi-function electric power conversion system 200, which constitutes a second embodiment of the invention. The second embodiment is applied to a system relatively large in capacity in which the bus line is of a high voltage system.

In FIG. 2, parts functionally corresponding to those which have been described with reference to FIG. 1 are therefore designated by the same reference numerals or characters. Hence, parts different from those in FIG. 1 will be mainly described.

In the multi-function electric power conversion system 200, the inverter INV is connected through a series circuit of the AC switch $SW_1$, a transformer $T_1$ and the circuit breaker $CB_1$ to the bus B between the current transformers $CT_1$ and $CT_2$. A current transformer $CT_5$ is connected to a line $B_2$ provided on the AC side of the inverter INV.

The line $B_2$ is connected through the circuit breaker $CB_6$ to the important load $LD_4$ and through a series circuit of the circuit breaker $CB_5$ and a switch $SW_2$ to the emergency load $LD_3$.

On the other hand, the bus B is connected through a series circuit of a circuit breaker $CB_7$, a transformer $T_2$, and the change-over switch $SW_2$ to the emergency load $LD_3$. A rated voltage relay $RY_2$ and an undervoltage relay $RY_3$ are connected to the secondary side of the transformer $T_2$ is connected to.

The second embodiment operates as follows: In the case where the commercial power source AC is normal, the active filter operation, the peak cut operation, and the battery (BT) charging operation of the inverter INV are performed in the same manner as in the above-described first embodiment. In the case of the active filter operation, the inverter INV operates to cause a current to flow which is opposite in phase to the harmonic currents flowing in the current transformers $CT_1$ and $CT_5$ to decrease the harmonic components from the current flowing in the current transformer $CT_2$, and to control the reactive currents flowing in the current transformers $CT_1$ and $CT_5$ thereby to convert the current flowing in the current transformer $CT_2$ into a current of a power factor 1 having no reactive component.

In these operation modes, the change-over switch $SW_2$ is retransferred to the commercial system (the side of the transformer $T_2$), so that the emergency load LD3 is supplied the power from the commercial power source.

When a failure occurs with the commercial power source AC or the supply voltage drops momentarily, the high-response undervoltage relay $RY_1$ operates immediately to turn off the AC switch $SW_1$, so that the inverter INV is placed in the reverse conversion mode; that is, the AC power is supplied to the importance load without being interrupted at all.

When a failure occurs with the commercial power source AC, the supply of power to the emergency load $LD_3$ is stopped once; however, in this case, the undervoltage relay $RY_3$ is operated, so that the change-over switch $SW_2$ is transferred the side of the inverter (the side of the circuit breaker $CB_5$), and therefore the inverter INV supplies AC power to the load $LD_3$. Since the change-over switch acts quickly, no trouble occurs to the emergency load $LD_3$.

In the second embodiment, the change-over switch $SW_2$ should be so controlled as to select the commercial power source's system or the inverter's system.

In the second embodiment, the sequence of the operations is basically equal to that shown in FIG. 3. For simplification, its description and illustration will not be made here.

In the second embodiment, the voltage applied to the AC switch $SW_1$ provided on the secondary side of the transformer $T_1$ is lower than the bus-bar voltage, and no current of the emergency load $LD_3$ flows into the AC switch $SW_1$. Hence, the AC switch $SW_1$ may be low in isolation voltage and small in current capacity, which contributes to a reduction of the manufacturing cost.

In each of the above-described embodiments, the DC energy storing means may be a solar cell which is connected through a chopper, or a storage battery, solar cell and a fuel cell which are parallel-connected to one another. In application of the invention to a power system, the number of phases is not limited.

As was described above, in the invention, the power conversion system can be placed in the forward conversion mode or in the reverse conversion mode according to the conditions of the commercial power source and the conditions of the load; that is, the system can perform the active filter operation, peak cut operation, battery charging operation, UPS operation, and emergency power generation operation by itself. Hence, the invention has the following effects or merits: The electric power can be improved in quality by eliminating the harmonic current and the reactive current. The electric power is continuously supplied and supply voltage is stabilized; that is, the electric power is supplied stably. In addition, the power demand is leveled by performing the peak cut operation, and the emergency power generation can be performed clean using no fossil fuel.

Furthermore, the invention is simple in arrangement, and is therefore most suitable as a distributed power source.

What is claimed is:

1. A multi-function electric power conversion system which is interconnected to an electric power system having an important load to which electric power must be continuously supplied without interruption, and which is connected through an AC semiconductor switch to a commercial power source provided for said electric power system, said electric power conversion system comprising:

a power conversion unit, connected to said electric power system, which can be placed selectively in a forward conversion operation mode and in a reverse conversion operation mode;

a DC energy storing unit connected to the DC side of said power conversion unit; and abnormal condition detecting means for detecting abnormal conditions of said commercial power source including a supply of power to meet a demand in excess of a predetermined value, and a loss of power or a drop in voltage from said commercial power source, wherein when said commercial power source is operating normally, said powerconversion unit is placed in the forward conversion operation mode to operate as an active filter for the electric power system, to charge said DC energy storing unit when at least some discharge thereof has occurred, when excess demand is placed on said commercial power source, said power conversion unit terminates the charging operation and is placed in the reverse conversion operation mode to convert power from the DC energy storing unit for application to the electric power system thereby meeting excess demand and cutting the peak in the power demand on said commercial power source, and when said abnormal condition detecting means detects a loss of power or severe drop in voltage from said commercial power source, said AC semiconductor switch is turned off, so that said power conversion unit is placed in a reverse conversion operation mode to operate as an uninterruptable power system, whereby electric power is supplied to said important load without interruption.

2. A multi-function electric power conversion system as claimed in claim 1, wherein said abnormal condition detecting means includes a high-response undervoltage relay and said power conversion unit incudes an inverter which is reversible in operation, an ac side of said inverter being connected to the electric power system while a dc side of said inverter is connected to batteries which are provided as said dc energy storing unit.

3. A multi-function electric power conversion system as claimed in claim 2, wherein, when said commercial power source is operating normally, said inverter controls reactive current flow in said electric power system, detects a power system harmonic current, and generates an offset harmonic current which is opposite in phase to said power system harmonic current to reduce system harmonic current flow.

4. A multi-function electric power conversion system as claimed in claim 2, wherein, when a demand power has exceeded a predetermined value, said inverter performs a reverse conversion operation to supply electric power corresponding to increasing of said demand power into the electric power system.

5. A multi-function electric power conversion system as claimed in claim 2, wherein, when said high-response undervoltage relay detects an abnormal condition of said commercial power source, said AC semiconductor switch is immediately turned off to disconnect the electric power conversion system from the commercial power and said inverter is switched from the forward conversion operation, in which active filtering is performed, to the reverse conversion operation, thereby to supply the DC power to the important load from the batteries.

* * * * *

UNITED STATES PATENT AND TRADEMARK OFFICE
CERTIFICATE OF CORRECTION

PATENT NO. : 5,747,887
DATED : May 5, 1998
INVENTOR(S) : Toshiyuki Takanaga, et. al.

It is certified that error appears in the above-identified patent and that said Letters Patent is hereby corrected as shown below:

Title page, item [73], Assignee, line 1, "Kundenko" should read --Kandenko--.
item [57], Abstract, line 4, "dc" should read --DC--; and
line 5, "ac" should read --AC--.

Claim 1, column 7, line 13, "powerconversion" should read --power conversion--.

Claim 2, column 8, line 4, "incudes" should read --includes--.

Claim 2, column 8, line 5, "ac" should read --AC--.

Claim 2, column 8, line 6, "dc" should read --DC--.

Claim 2, column 8, line 8, "dc" should read --DC--.

Claim 5, column 8, line 27, after "commercial power", insert --source--.

Signed and Sealed this

Sixth Day of April, 1999

Attest:

*Attesting Officer*

Q. TODD DICKINSON

*Acting Commissioner of Patents and Trademarks*